(12) United States Patent
Nishimura

(10) Patent No.: US 9,909,612 B2
(45) Date of Patent: Mar. 6, 2018

(54) SEAL STRUCTURE

(71) Applicant: HI-LEX CORPORATION, Hyogo (JP)

(72) Inventor: Atsushi Nishimura, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 15/329,325

(22) PCT Filed: Jul. 27, 2015

(86) PCT No.: PCT/JP2015/071193
§ 371 (c)(1),
(2) Date: Jan. 26, 2017

(87) PCT Pub. No.: WO2016/017565
PCT Pub. Date: Feb. 4, 2016

(65) Prior Publication Data
US 2017/0204896 A1 Jul. 20, 2017

(30) Foreign Application Priority Data
Jul. 28, 2014 (JP) .................................. 2014-153367

(51) Int. Cl.
*F16J 15/06* (2006.01)
*F16C 1/10* (2006.01)
*F16J 15/02* (2006.01)

(52) U.S. Cl.
CPC ............. *F16C 1/107* (2013.01); *F16J 15/022* (2013.01)

(58) Field of Classification Search
CPC .................................. F16C 1/107; F16J 15/022
See application file for complete search history.

(56) References Cited

U.S. PATENT DOCUMENTS 8,690,161 B2 * 4/2014 Cayzac ............... B60R 16/0222
174/650
8,692,122 B2 * 4/2014 Suzuki ............... B60R 16/0222
16/2.2

(Continued)

FOREIGN PATENT DOCUMENTS

| JP | 2009-068518 A | 4/2009 |
| JP | 2011-185294 A | 9/2011 |
| JP | 2011-190834 A | 9/2011 |

OTHER PUBLICATIONS

International Search Report from International Application No. PCT/JP2015/071193 dated Sep. 1, 2015.

*Primary Examiner* — Gilbert Y Lee
(74) *Attorney, Agent, or Firm* — Brundidge & Stanger, P.C.

(57) ABSTRACT

A seal structure includes: a longitudinal member; and an elastic member having an insertion part into which the longitudinal member is inserted and which is brought into close contact with the outer circumference of the longitudinal member. The insertion part includes: a tubular part having openings on both ends; an insertion hole which is connected to both of the openings and through which the longitudinal member is inserted; and a seal part for sealing the longitudinal member in the inner wall of the insertion hole. The seal part has: first projections that can closely contact, in the circumferential direction, the longitudinal member inserted into the insertion hole; and second projections that can contact, on the outer circumference of the longitudinal member, the longitudinal member inserted into the insertion hole.

4 Claims, 10 Drawing Sheets

(56) References Cited

U.S. PATENT DOCUMENTS 9,403,433 B1* 8/2016 Knight .................. B60K 20/04
2014/0300062 A1* 10/2014 Nakai .................... F16J 15/106
　　　　　　　　　　　　　　　　　　　　　　　277/616

* cited by examiner

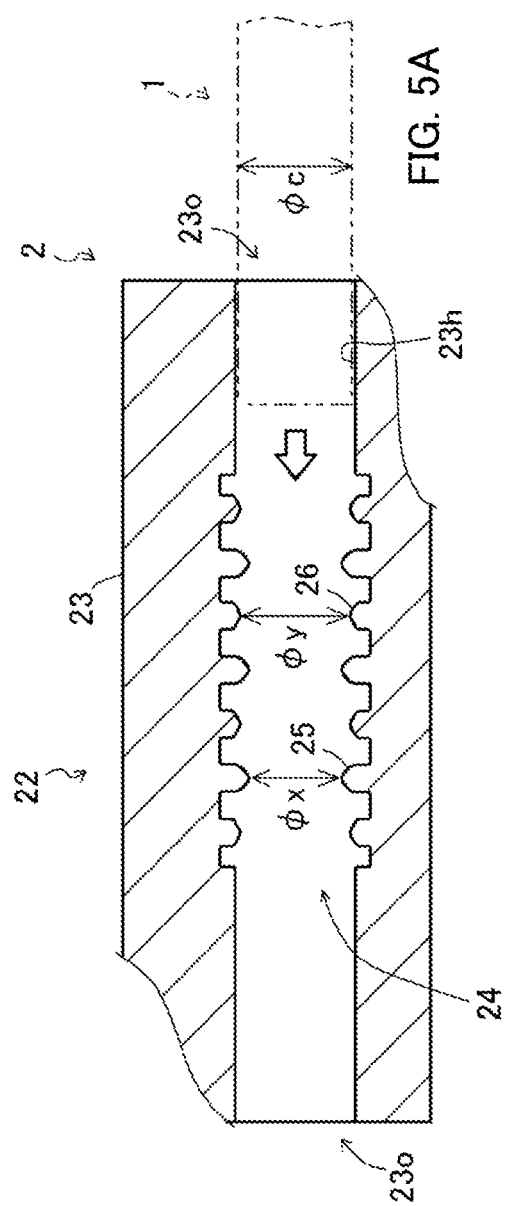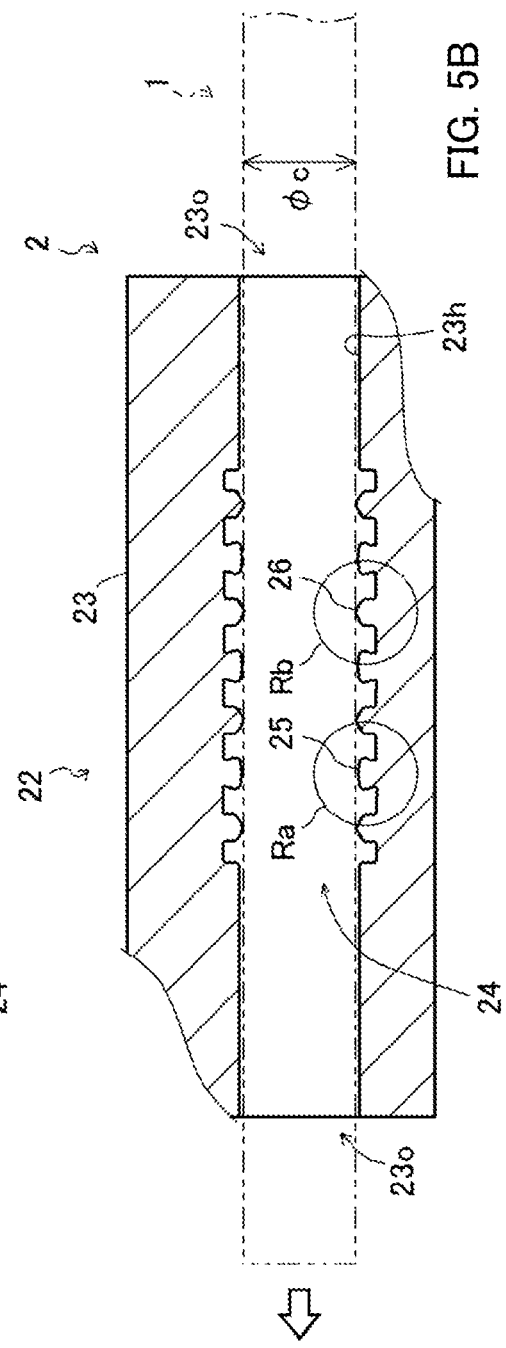

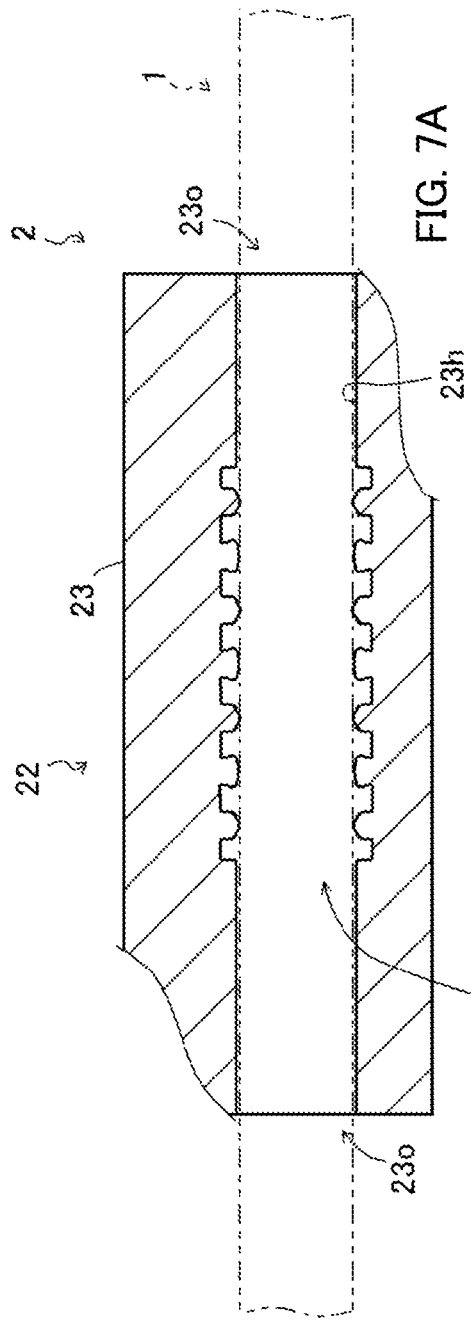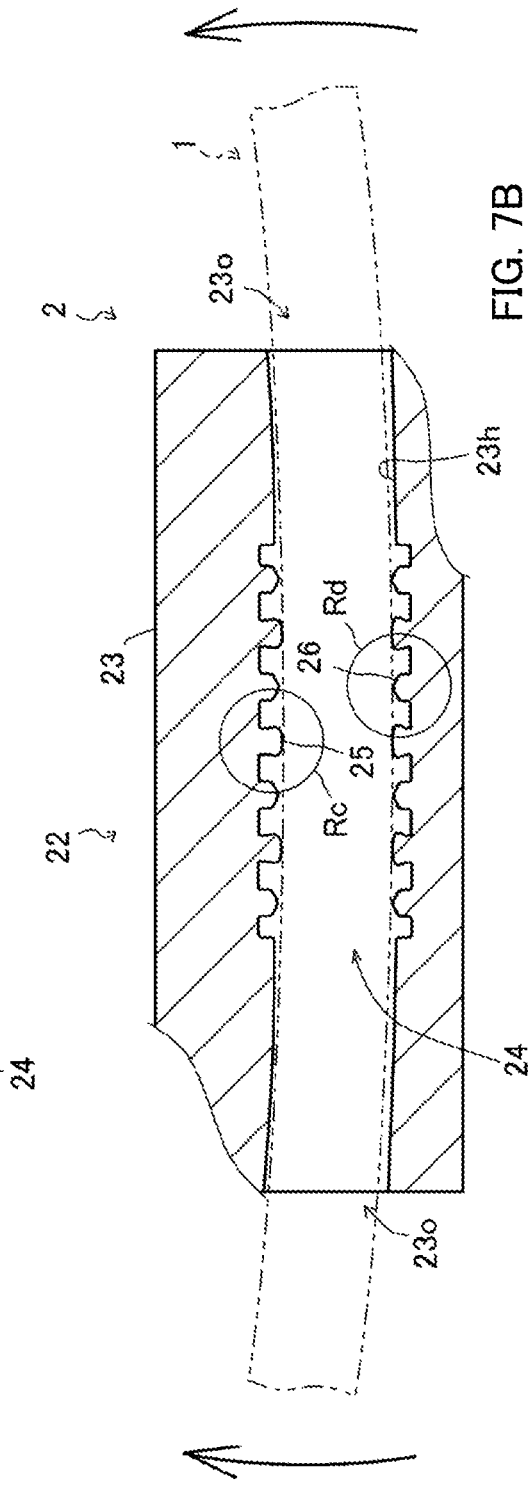

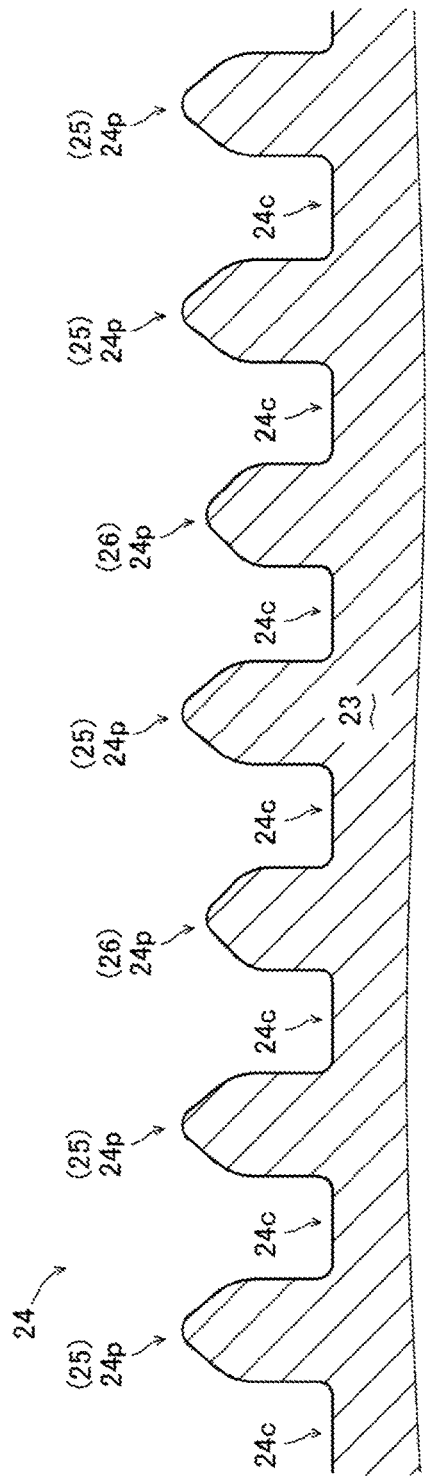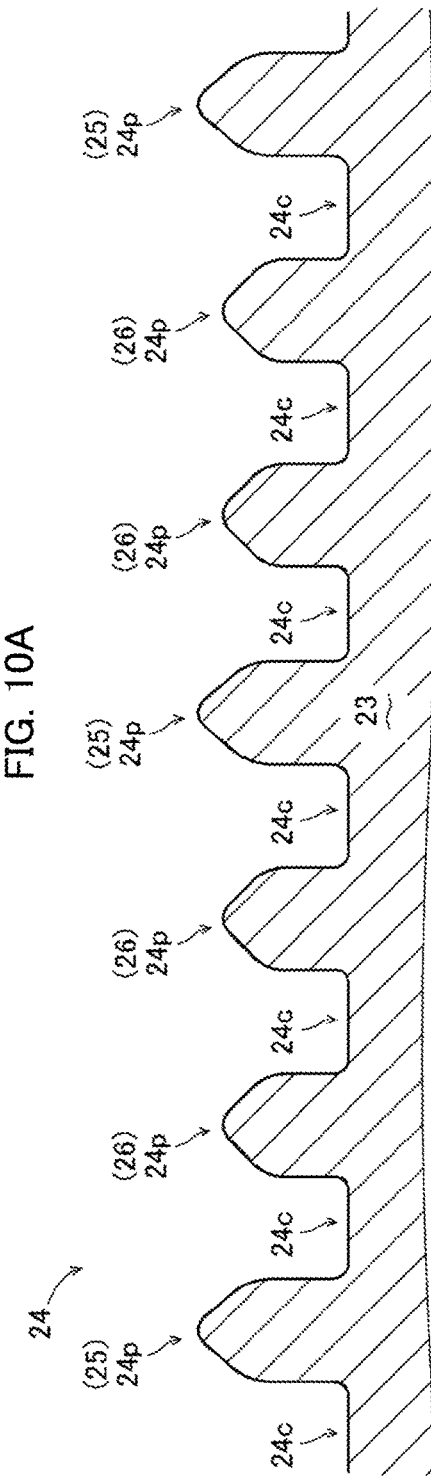

SEAL STRUCTURE

TECHNICAL FIELD

The present invention relates to a technique for a seal structure to seal a long member at an inner wall of an insertion hole.

BACKGROUND ART

Grommets through which control cables are inserted have been known (see, e.g., Patent Literature (hereinafter, referred to "PTL") 1). Such a grommet is provided with a seal portion that seals against moisture such as rain water at an inner wall of an insertion hole. However, when protruding portions to be provided at the seal portion for the purpose of making insertion of a control cable easier are placed at intervals, there may be a case where the shape of the seal portion cannot conform to a curve shape of the control cable when the control cable curves and a gap is generated between the control cable and the protruding portions, causing a decrease in seal efficiency.

CITATION LIST

Patent Literature

PTL 1
Japanese Patent Application Laid-Open No. 2009-68518

SUMMARY OF INVENTION

Technical Problem

It is therefore an object of the present invention to provide a technique for a seal structure which allows easy insertion of a long member and does not cause a decrease in seal efficiency even when the long member curves.

Solution to Problem

A problem to be solved by the present invention is as described above, and a means for solving the problem will be described, next.

More specifically, according to the present invention, a seal structure is provided, including: a long member; and an elastic member including an insertion portion through which the long member is inserted and which comes into close contact with an outer periphery of the long member, in which: the insertion portion includes: a cylindrical portion including openings at both ends of the cylindrical portion, an insertion hole which communicates with the openings and through which the long member is inserted, and a seal portion configured to seal the long member at an inner wall of the insertion hole, in which: the seal portion includes: a first protruding portion formed to be capable of circumferentially coming into close contact with the long member inserted through the insertion hole, and a second protruding portion formed to be capable of coming into contact with the outer periphery of the long member for the long member inserted through the insertion hole.

According to the present invention, in the above seal structure: a plurality of the first protruding portions are disposed with an interval that allows the long member to be inserted through the insertion hole, and the second protruding portion is disposed between the first protruding portions.

According to the present invention, in the above seal structure: the second protruding portion is formed so that the second protruding portion is annular in a circumferential direction of the insertion hole and that an inner diameter of a top portion of the second protruding portion is substantially identical to an outer diameter of the long member, and the first protruding portion is formed so that first protruding portion is annular in the circumferential direction of the insertion hole and that an inner diameter of a top portion of the first protruding portion is smaller than the outer diameter of the long member and smaller than the inner diameter of the second protruding portion.

According to the present invention, in any one of the above seal structures, an inner diameter of a top portion of the second protruding portion is between 100 percent and 92 percent of an outer diameter of the long member.

Advantageous Effects of Invention

As an effect of the present invention, the following effect will be brought about.

According to the present invention, a seal structure which allows easy insertion of a long member and does not cause a decrease in seal efficiency even when the long member curves is achieved.

BRIEF DESCRIPTION OF DRAWINGS

FIGS. 5A and 5B are partially enlarged explanatory diagrams respectively illustrating the insertion portions before and after insertion of a control cable;

FIGS. 7A and 7B are diagrams illustrating respectively the insertion portions before and after the control cable curves in a state where the control cable is inserted through the grommet of FIG. 1;

FIGS. 10A and 10B are diagrams each illustrating unevenness provided in a seal portion of a grommet according to another embodiment.

DESCRIPTION OF EMBODIMENTS

A technical idea of the present invention is applicable to any elastic member through which a long member is inserted. In this application, a description will be given while the long member and the elastic member are referred to as "control cable 1" and "grommet 2," respectively.

Figure 1:
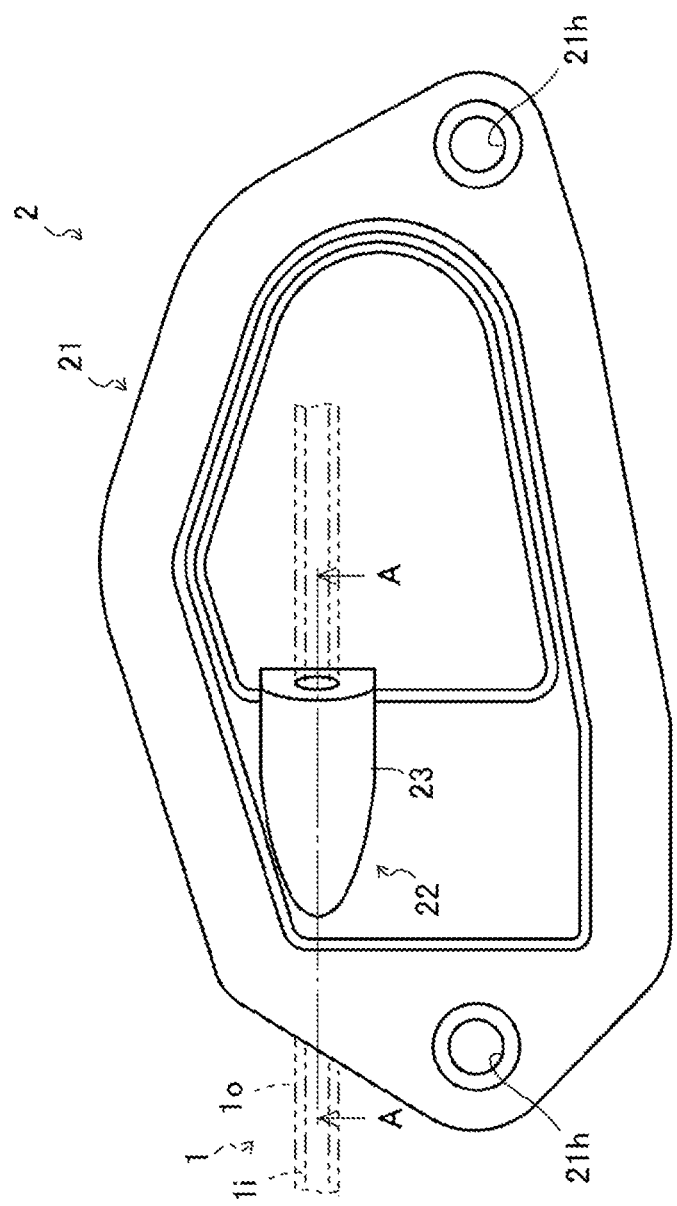
FIG. 1 is a top view illustrating a grommet according to a first embodiment of the present invention.
Figure 2:
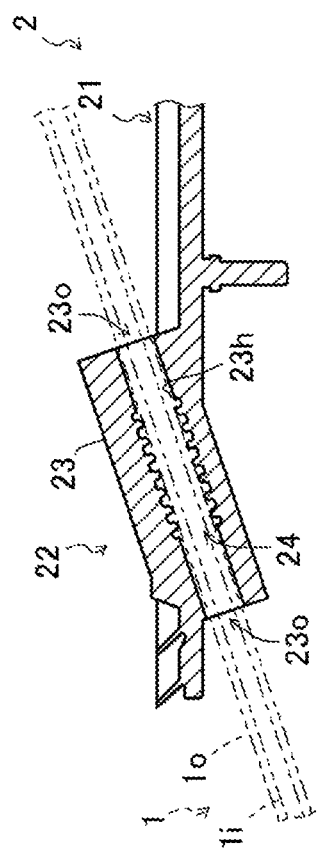
FIG. 2 is a partially enlarged cross-sectional view of an insertion portion along A-A cross section of FIG. 1.

FIG. 1 illustrates grommet 2 according to a first embodiment. FIG. 2 illustrates A-A cross-section in FIG. 1. Note that, alternate long and two short dashes lines in the drawings represent control cable 1.

Control cable 1 will be briefly described, first.

As described above, the long member in this application refers to control cable 1, in particular, outer casing 1o. Control cable 1 is composed of inner cable 1i and outer casing 1o covering this inner cable 1i. However, the long member is not limited to any particular configuration and may be inner cable 1i, a power transmission line, a communication line, and/or the like, for example. As for the long member, it is possible to employ a member having a predetermined length and disposed to pass through inner and outer sides such as the inside and outside of a vehicle, and it is preferable that an outer peripheral surface of this member be a smooth and flat surface.

Grommet 2 will be described, next.

Grommet 2 according to this embodiment is configured to hold control cable 1 in a state of being attached to a chassis panel or the like of an automobile. Grommet 2 is composed of body portion 21 and insertion portion 22 provided at this body portion 21. Note that, grommet 2 is formed of an elastic material (such as ethylene-propylene-diene (EPDM) rubber). However, the material of grommet 2 is not limited to any particular material, and may be, for example, nitrile rubber (NBR) or chloroprene rubber (CR) or the like. In addition, a material obtained by incorporating an elastic material into some part of a non-elastic material may be adopted. In this case, one that is obtained by attaching insertion portion 22 formed of rubber to body portion 21 formed of metal, for example, by baking may be adopted. As an elastic member, any member may be used as long as the member has an elastic function so that the member can come into close contact with outer casing 1o which is the long member, and control cable 1 is inserted by covering an outer periphery of the long member, and thus, a seal structure can be formed.

Body portion 21 refers to a flat and broad portion of grommet 2. Body portion 21 is formed in a polygonal shape and covers a cable hole provided in the chassis panel. In addition, body portion 21 is provided with two bolt holes 21h and fixed to the chassis panel by bolts passed through these two bolt holes 21h.

Insertion portion 22 is a portion where the long member is inserted through, and in this embodiment, insertion portion 22 includes a portion where cylindrical portion 23 is formed in grommet 2. Cylindrical portion 23 includes insertion hole 23h formed at a center of cylindrical portion 23 and has a predetermined thickness that allows holding of the long member and thus holds control cable 1 arranged up to the cable hole. In addition, insertion hole 23h includes seal portion 24 provided at an inner wall of insertion hole 23h and seals control cable 1 by seal portion 24. More specifically, insertion hole 23h includes seal portion 24 at the inner wall of insertion hole 23h and seals an outer periphery of outer casing 1o by unevenness of seal portion 24.

Hereinafter, insertion portion 22 will be described in detail.

Figure 3:
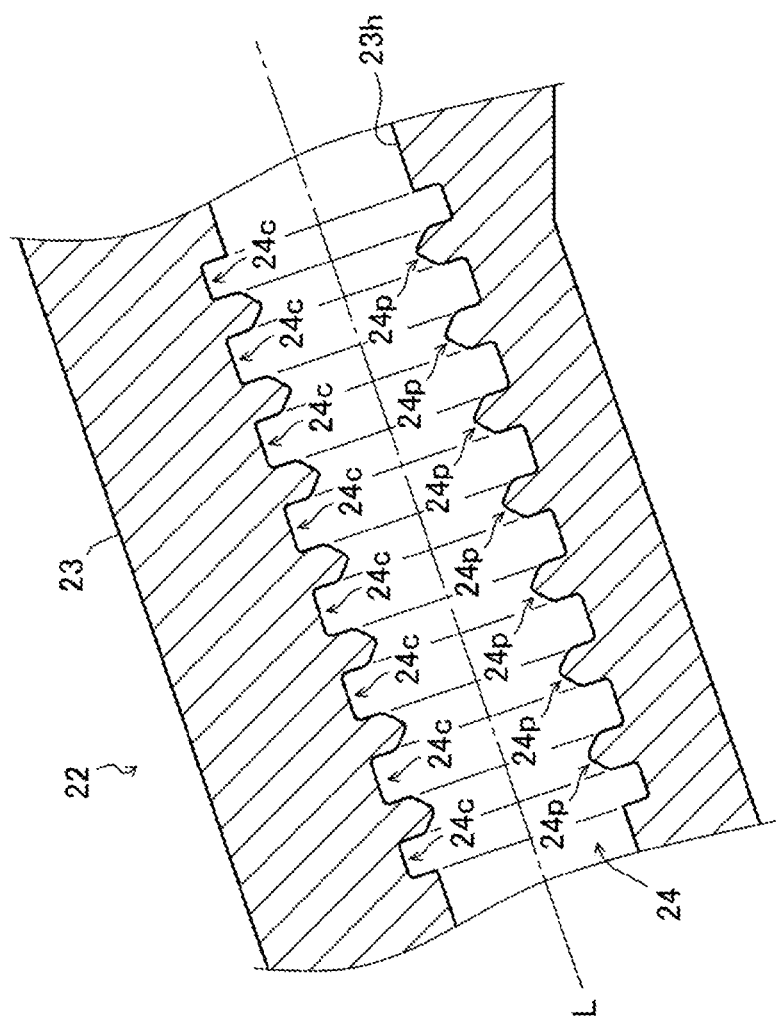
FIG. 3 is a partially enlarged cross-sectional view of the insertion portion of the grommet in the cross section of FIG. 2.
Figure 4:
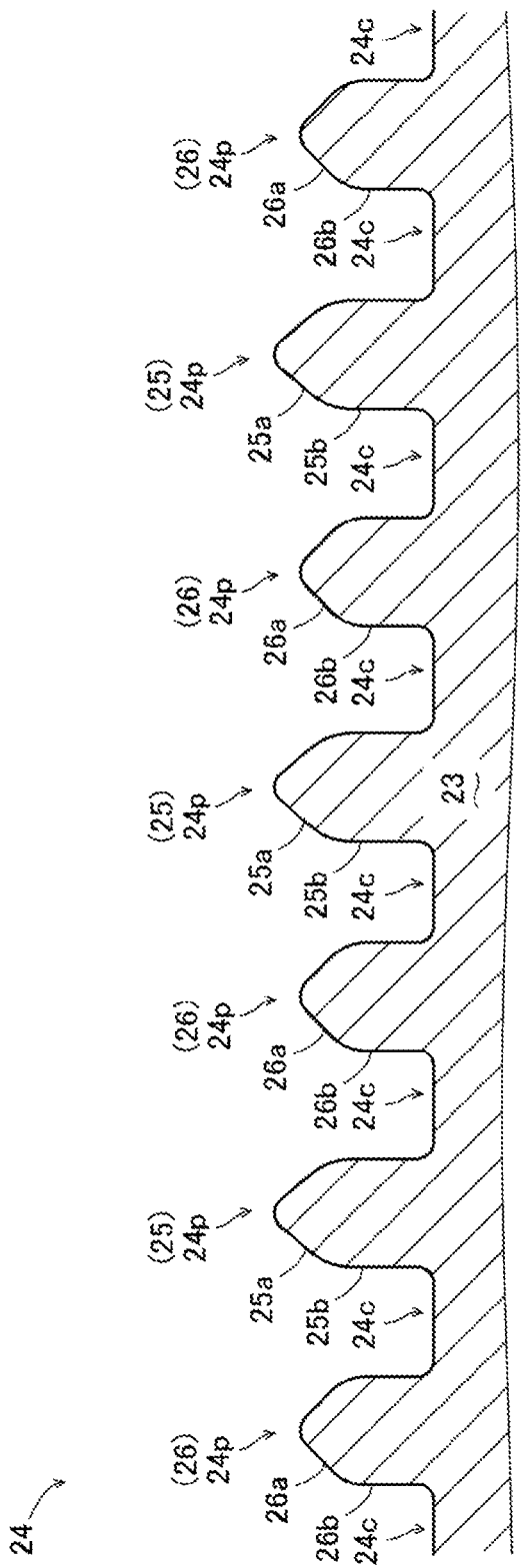
FIG. 4 is an explanatory diagram illustrating unevenness provided in a seal portion of FIG. 3.

FIG. 3 illustrates insertion portion 22 of grommet 2. FIG. 4 illustrates unevenness provided at seal portion 24.

As described above, insertion portion 22 includes a portion where cylindrical portion 23 is formed in grommet 2. Cylindrical portion 23 includes openings 23o at both ends thereof (see FIG. 2). Openings 23o are each formed to have a size that allows control cable 1 to be inserted, and in this embodiment, each opening 23o is formed in a circular shape although it is not limited to any particular shape. In addition, insertion hole 23h is formed so as to communicate with both openings 23o. More specifically, cylindrical portion 23 has a shape in which insertion hole 23h is formed to penetrate from one of openings 23o to the other one of openings 23o. Insertion hole 23h is provided with seal portion 24 at the inner wall thereof and seals an outer periphery of outer casing 1o by the unevenness of seal portion 24. Seal portion 24 is provided in such a way that the unevenness are axially apart from each other, and seals the outer periphery of outer casing 1o so that moisture is prevented from moving along the outer periphery of outer casing 1o to an inner side, thereby making it possible to exert waterproofing performance. Note that, how insertion hole 23h is provided is not limited to any particular way as long as insertion hole 23h is provided to allow control cable 1 to be routed through the inside and outside of a vehicle, and in this embodiment, insertion hole 23h is formed in a cylindrical shape.

In this grommet 2, recess portions 24c of the unevenness are formed annularly about center axis L of insertion hole 23h. All recess portions 24c have an identical depth. Meanwhile, protruding portions 24p of the unevenness are formed annularly about center axis L of insertion hole 23h. However, not all protruding portions 24p have an identical height. More specifically, protruding portions 24p in grommet 2 include two kinds of protruding portions 24p, which are one with a higher height and the other with a lower height. In this application, protruding portion 24p with a higher height is defined as "first protruding portion 25" and protruding portion 24p with a lower height is defined as "second protruding portion 26."

First protruding portions 25 are each configured to come into close contact with control cable 1 and to seal control cable 1. More specifically, first protruding portion 25 comes into close contact with outer casing 1o of control cable 1, thereby sealing against moisture such as rain water moving along outer casing 1o. First protruding portion 25 may have resistance to insertion that does not deteriorate the insertion property of outer casing 1o which is the long member, and may be configured to have a shape capable of coming into close contact with an outer shape of outer casing 1o. Note that, the term "come into close contact with" means a state where first protruding portion 25 having elastically deformed presses hard against an outer periphery of outer casing 1o, so that the pressure of the contact portion increases. In terms of functionality, this term means a state where it is possible to surely seal against moisture such as rain water. Note that, since first protruding portions 25 have a role of sealing against moisture such as rain water, first protruding portions 25 are always circumferentially annular and do not include a spiral.

In first protruding portion 25, a cross-sectional shape of base portion 25b is substantially rectangular. Furthermore, top portion 25a has a substantially wedge shape in which top portion 25a is tapered as a cross-sectional shape of top portion 25a nears center line L. More specifically, the cross-sectional shape of first protruding portion 25 extends perpendicularly toward center line L from a bottom of recess portion 24c and is tapered starting from a predetermined height. This shape is adopted for the purpose of adequately keeping rigidity of a root portion and of reducing a contact area with control cable 1. This increases flexibility of first protruding portion 25 and simultaneously achieves an improvement in the sealing function. Meanwhile, the flexibility of first protruding portion 25 can be increased by forming recess portion 24c with a greater depth. Note that, inner diameter $\phi x$ of top portion 25a of first protruding portion 25 is between 99% and 65% of outer diameter $\phi c$ of control cable 1 (see FIGS. 5A and 5B). The numerical value of inner diameter $\phi x$ is calculated by the following expression.

Expression: φx/φc×100=99 to 65(%)

A ratio of inner diameter φx to outer diameter φc can be practically within a range of 65% to 99% both inclusive. However, in order to improve workability while securing the seal efficiency, the ratio is preferably within a range of 87% to 95% both inclusive. Note that, the term "top portion" means a portion around a top of first protruding portion 25, which is closest to an axis side in a portion of first protruding portion 25 protruding in the axial direction of insertion hole 23h. This portion is a portion which comes into contact with the outer periphery of outer casing 1o and where elastic deformation of first protruding portion 25 occurs at the time of insertion of control cable 1. In this embodiment, as described above, this portion is configured to have a protruding shape, and in cases of first protruding portions 25 as well as second protruding portions 26 to be described hereinafter, the inner diameter is defined with reference to a leading end of the protruding portion.

Second protruding portions 26 are each configured to come into contact with control cable 1 and to seal control cable 1. More specifically, second protruding portion 26 comes into contact with outer casing 1o of control cable 1, thereby sealing against moisture such as rain water moving along outer casing 1o. Note that, the term "come into contact with" means a state where second protruding portion 26 having elastically deformed lightly presses against the outer periphery of outer casing 1o, so that the pressure of the contact portion somewhat increases. In terms of functionality, this term means a state where it is possible to auxiliary seal against moisture such as rain water while insertion of control cable 1 is made easy. Note that, since second protruding portions 26 have a role of sealing against moisture such as rain water, second protruding portions 26 are preferentially circumferentially annular about center axis L of insertion hole 23h. However, as long as first protruding portions 25 can secure the sealing function, second protruding portions 26 are not necessarily annular.

In second protruding portion 26, a cross-sectional shape of base portion 26b is substantially rectangular. Furthermore, top portion 26a has a substantially wedge shape in which top portion 26a is tapered as a cross-sectional shape of top portion 26a nears center line L. More specifically, the cross-sectional shape of second protruding portion 26 extends perpendicularly toward center axis L from a bottom of recess portion 24c and is tapered starting from a predetermined height. This shape is adopted for the purpose of adequately keeping rigidity of a root portion and of reducing the contact area with control cable 1. This increases flexibility of second protruding portion 26 and simultaneously achieves an improvement in the sealing function. Meanwhile, the flexibility of second protruding portion 26 can be increased by forming recess portion 24c with a greater depth. Regarding the height of second protruding portion 26 from the bottom of recess portion 24c of second protruding portion 26, second protruding portion 26 is configured to have a height that allows second protruding portion 26 to come into contact with the outer periphery of outer casing 1o which is a direct sealing target and configured not to generate resistance to insertion and not to elastically deform at the time of insertion of control cable 1 by setting inner diameter φy of second protruding portion 26 to be larger than inner diameter φx of first protruding portion 25. Note that, inner diameter φy of top portion 26a of second protruding portion 26 is between 100 percent and 92 percent of outer diameter φc of control cable 1 (see FIGS. 5A and 5B). This numerical value of the inner diameter φy is calculated by the following expression.

Expression: φy/φc×100=100 to 92(%)

In this embodiment, while outer diameter φc of outer casing 1o is 7.1 mm, inner diameter φx of first protruding portion 25 is set to 6.4 mm, and inner diameter φy of second protruding portion 26 is set to 6.8 mm.

Next, first and second protruding portions 25 and 26 will be described in more detail.

Figure 6A:
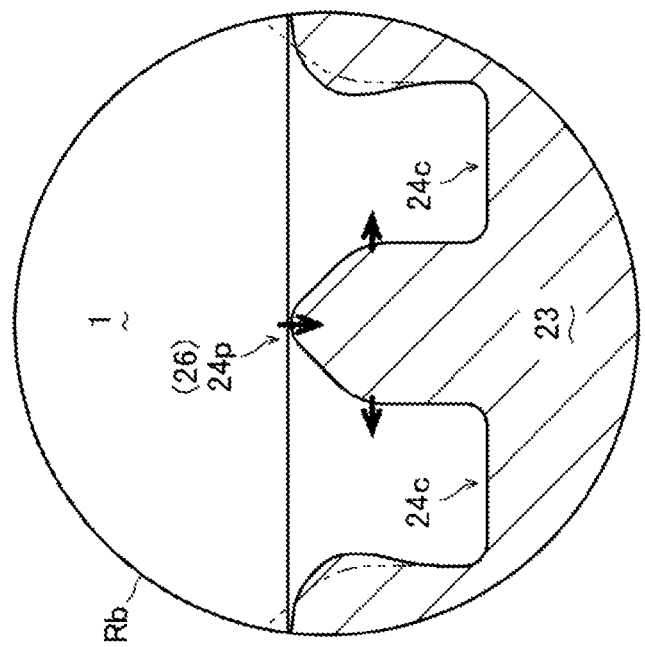
FIGS. 6A and 6B are explanatory diagrams respectively illustrating regions Ra and Rb in FIG. 5B in an enlarged manner.
Figure 6B:
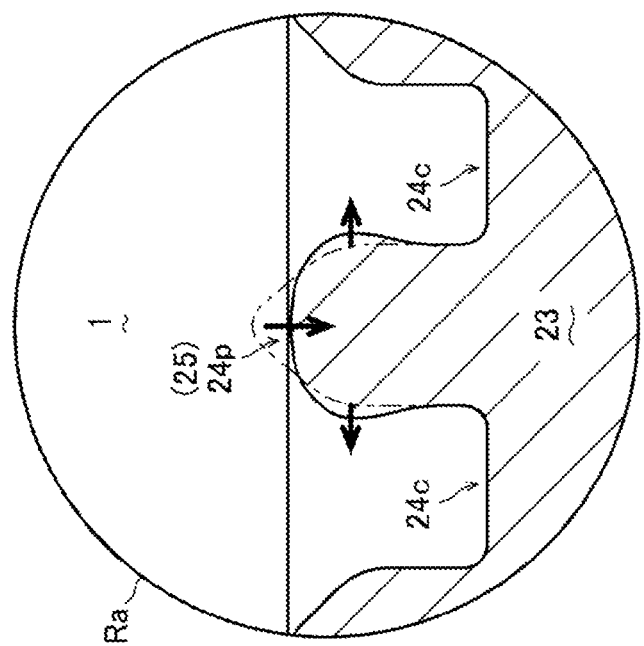
Figure 8A:
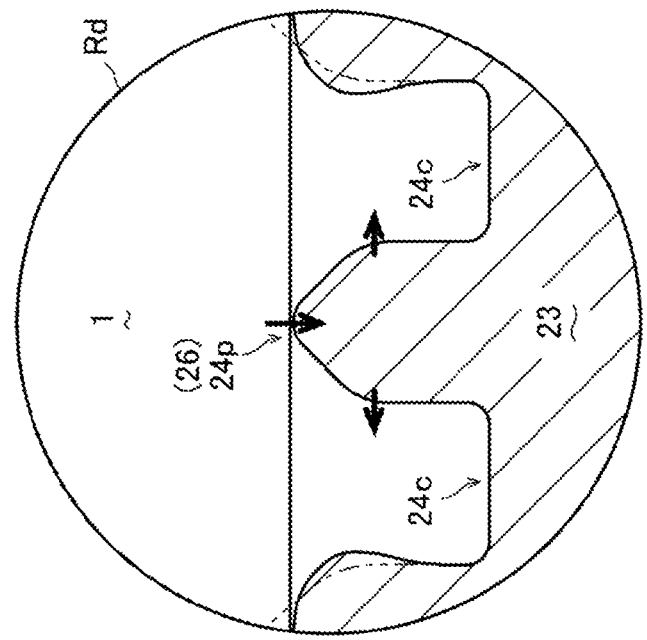
FIGS. 8A and 8B are diagrams respectively illustrating regions Rc and Rd in FIG. 7B in an enlarged manner.
Figure 8B:
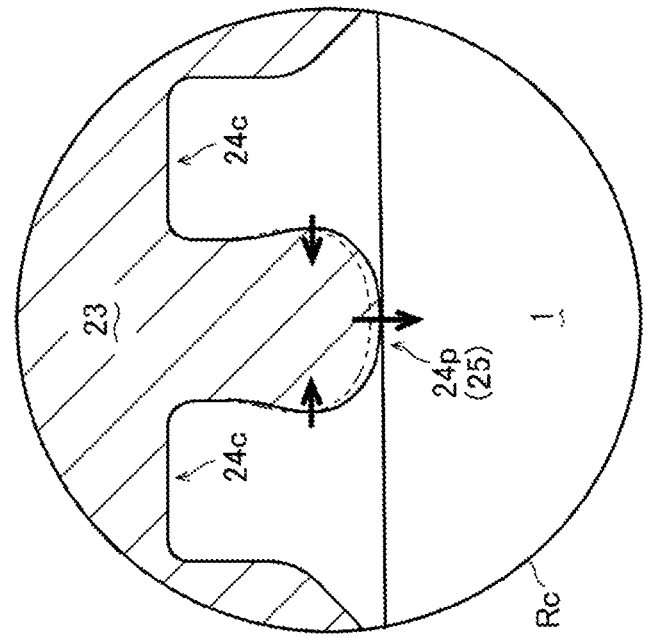

FIGS. 5A and 5B respectively illustrate insertion portions 22 before and after insertion of control cable 1. FIGS. 6A and 6B are diagrams respectively illustrating regions Ra and Rb in FIG. 5B in an enlarged manner. FIGS. 7A and 7B respectively illustrate insertion portions 22 before and after control cable 1 curves. FIGS. 8A and 8B are diagrams respectively illustrating regions Rc and Rd in FIG. 7B in an enlarged manner. Note that, the arrows illustrated in FIGS. 6A, 6B, 8A and 8B represent directions in which first protruding portion 25 or second protruding portion 26 deform.

In grommet 2, inner diameter φx of top portion 25a of first protruding portion 25 is smaller than outer diameter φc of control cable 1. Meanwhile, inner diameter φy of top portion 26a of second protruding portion 26 is substantially identical to outer diameter φc of control cable 1. Accordingly, first protruding portion 25 deforms due to insertion of control cable 1 and second protruding portion 26 hardly deforms. For this reason, first protruding portion 25 serves as resistance at the time of insertion of control cable 1 but second protruding portion 26 hardly serves as resistance.

In this regard, first and second protruding portions 25 and 26 in grommet 2 are alternately provided, and first protruding portions 25 are each disposed with an appropriate interval from adjacent one of second protruding portions 26. For this reason, even when first protruding portion 25 deforms due to insertion of control cable 1, first protruding portion 25 does not interfere with adjacent second protruding portion 26. More specifically, even when first protruding portion 25 deforms due to insertion of control cable 1 and thus expands and/or bend in the axial direction of insertion hole 23h, first protruding portion 25 does not come to contact with adjacent second protruding portion 26. Accordingly, first protruding portion 25 easily deforms at the time of insertion of control cable 1 and does not become a large resistance that hinders an insertion operation. In this application, an interval with which first and second protruding portions 25 and 26 do not interfere with each other even when first protruding portion 25 deforms at the time of insertion of control cable 1 is defined as "interval that allows the long member (control cable 1) to be inserted through insertion hole 23h." Note that, when first protruding portions 25 are provided in an overcrowded manner, the resistance to insertion of control cable 1 may increase. Therefore, intervals may be adjusted appropriately in accordance with inner diameter φx of first protruding portions 25.

Moreover, since the amount of deformation of first protruding portion 25 before and after insertion of control cable 1 is large, first protruding portion 25 comes into close contact with outer casing 1o of control cable 1. In addition, since the amount of deformation of first protruding portion 25 before and after insertion of control cable 1 is large, first protruding portion 25 has large room for extension, and a gap is unlikely to be generated even when control cable 1 curves. In other words, first protruding portion 25 flexibly deforms in accordance with a curve shape of control cable 1 and always comes into close contact with outer casing 1o of control cable 1. More specifically, it can be seen that first protruding portion 25 in region Rc extends in accordance with the curve of control cable 1 and is kept in a state of coming into close contact with control cable 1.

Meanwhile, since the amount of deformation of second protruding portion 26 before and after insertion of control cable 1 is small, second protruding portion 26 comes into contact with outer casing 1o of control cable 1. In addition, since the amount of deformation of second protruding portion 26 before and after insertion of control cable 1 is small, second protruding portion 26 has large room for contraction, and a gap is unlikely to be generated even when control cable 1 curves. More specifically, second protruding portion 26 flexibly deforms in accordance with a curve shape of control cable 1 and always comes into contact with outer casing 1o of control cable 1. More specifically, it can be seen that second protruding portion 26 in region Rd contracts in accordance with the curve of control cable 1 and is kept in a state of coming into contact with control cable 1.

As described above, the characteristics of grommet 2 are summarized as follows.

As a first characteristic, grommet 2 has insertion portion 22. Insertion portion 22 includes: cylindrical portion 23 provided with openings 23o at both ends thereof; insertion hole 23h which communicates with both openings 23o and through which control cable 1 is inserted; and seal portion 24 which seals control cable 1 at an inner wall of insertion hole 23h. Moreover, seal portion 24 includes: first protruding portions 25 formed so as to be capable of circumferentially coming into close contact with control cable 1 inserted through insertion hole 23h; and second protruding portions 26 formed so as to be capable of coming into contact with the outer periphery of control cable 1 for control cable 1 inserted through insertion hole 23h.

As a second characteristic, first protruding portions 25 are disposed with intervals that allow control cable 1 to be inserted through insertion hole 23h. Moreover, second protruding portions 26 are each disposed between first protruding portions 25.

As a third characteristic, second protruding portions 26 are formed so that second protruding portions 26 are each annular in a circumferential direction of insertion hole 23h and that inner diameter φy of top portion 26a is substantially identical to outer diameter φc of control cable 1. Meanwhile, first protruding portions 25 are formed so that first protruding portions 25 are each annular in a circumferential direction of insertion hole 23h and that inner diameter φx of top portion 25a is smaller than outer diameter φc of control cable 1 and is also smaller than the inner diameter of second protruding portion 26.

As a fourth characteristic, inner diameter φy of second protruding portion 26 of top portion 26a is between 100 percent and 92 percent of the outer diameter of control cable 1.

According to the characteristics described above, grommet 2 allows easy insertion of control cable 1 and does not cause a decrease in seal efficiency even when control cable 1 curves. More specifically, use of the technical idea of the present invention makes it possible to achieve a seal structure which allows easy insertion of a long member and does not cause a decrease in seal efficiency even when the long member curves.

Next, grommet 2 according to another embodiment will be described.

FIGS. 9A through 9D each illustrate a shape of protruding portion 24p of grommet 2 according to another embodiment. Hereinafter, for simplicity of the drawings, the shapes of first protruding portion 25 and second protruding portion 26 are expressed as single protruding portion 24p.

Figure 9D:
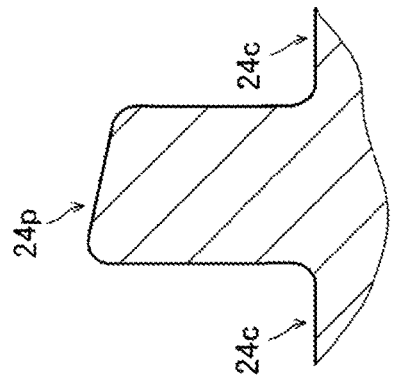
FIGS. 9A through 9D are each a diagram illustrating a shape of a protruding portion of a grommet according to another embodiment.
Figure 9A:
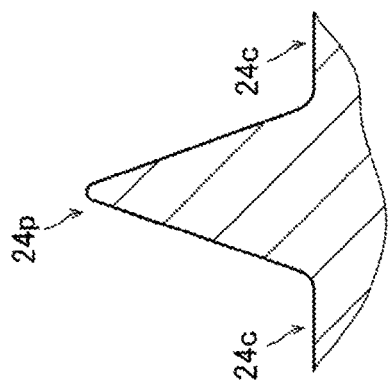

In first protruding portion 25 of grommet 2 according to the first embodiment, the cross-sectional shape of base portion 25b is substantially rectangular (see FIG. 4). This shape is adopted for the purpose of adequately keeping the rigidity of the root portion and of increasing flexibility. However, in the present application, the cross-sectional shape of base portion 25b is not limited to be substantially rectangular. For example, as illustrated in FIG. 9A, a substantially wedge shape in which base portion 25b is tapered as the cross-sectional shape thereof nears center line L may be adopted.

Figure 9C:
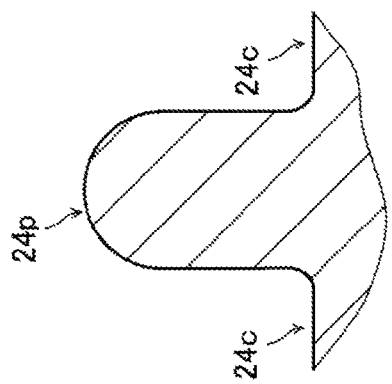
Figure 9B:
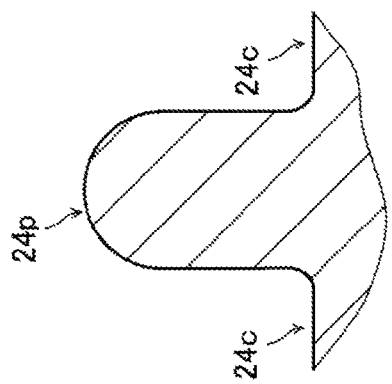

Furthermore, as described above, in first protruding portion 25 of grommet 2 according to the first embodiment, top portion 25a has a substantially wedge shape in which top portion 25a is tapered as the cross-sectional shape thereof nears center line L (see FIG. 4). However, in this application, the cross-sectional shape of top portion 25a is not limited to the substantially wedge shape. For example, as illustrated in FIG. 9B, it is possible to adopt a substantially rectangular shape. In addition, a substantially circular-arc shape may be adopted as illustrated in FIG. 9C. Furthermore, a substantially trapezoidal shape may be adopted as illustrated in FIG. 9D. Note that, in a case where a substantially trapezoidal shape is adopted as illustrated in FIG. 9D, the insertion operation of control cable 1 is made easy by inserting control cable 1 from a lower side to an upper side of an inclined surface.

In second protruding portion 26 of grommet 2 according to the first embodiment, the cross-sectional shape of base portion 26b is substantially rectangular (see FIG. 4). This shape is adopted for the purpose of adequately keeping the rigidity of the root portion and of increasing flexibility. However, in this application, the cross-sectional shape of base portion 26b is not limited to be substantially rectangular. For example, as illustrated in FIG. 9A, a substantially wedge shape in which base portion 26b is tapered as the cross-sectional shape thereof nears center line L may be adopted.

Moreover, as described above, in second protruding portion 26 of grommet 2 according to the first embodiment, top portion 26a has a substantially wedge shape in which top portion 26a is tapered as the cross-sectional shape of top portion 26a nears center line L (see FIG. 4). However, in this application, the cross-sectional shape of top portion 26a is not limited to the substantially wedge shape. For example, as illustrated in FIG. 9B, it is possible to adopt a substantially rectangular shape. In addition, a circular-arc shape may be adopted as illustrated in FIG. 9C. Furthermore, a substantially trapezoidal shape may be adopted as illustrated in FIG. 9D. Note that, in a case where a substantially trapezoidal shape is adopted as illustrated in FIG. 9D, the insertion operation of control cable 1 is made easy by inserting control cable 1 from a lower side to an upper side of an inclined surface.

Furthermore, grommet 2 according to another embodiment will be described.

FIGS. 10A and 10B each illustrate unevenness provided in seal portion 24 of grommet 2 according to another embodiment.

First and second protruding portions 25 and 26 of grommet 2 according to the first embodiment are alternately provided (see FIG. 4). This configuration is adopted for exerting a stable function in all first and second protruding portions 25 and 26. However, in this application, how first and second protruding portions 25 and 26 are provided is not limited to the configuration in which first and second protruding portions 25 and 26 are alternately provided. For example, as illustrated in FIG. 10A, first protruding portions 25 may be provided next to each other. Moreover, as illustrated in FIG. 10B, second protruding portions 26 may be provided next to each other. Furthermore, first and second protruding portions 25 and 26 may be provided in a way other than the ways illustrated in FIGS. 10A and 10B. More specifically, in the present invention, as long as second protruding portions 26 are provided so as to exert an auxiliary sealing function, first protruding portions 25 may be provided with second protruding portion 26 interposed therebetween or first and second protruding portions 25 may be separated from each other while first protruding portions 25 are provided next to each other and second protruding portions 26 are also provided next to each other, and it is also possible to appropriately adopt a configuration in such a way that second protruding portions 26 do not hinder elastic deformation of first protruding portions 25.

REFERENCE SIGNS LIST

1 Control cable (long member)
1i Inner cable
1o Outer casing
2 Grommet (elastic member)
21 Body portion
22 Insertion portion
23 Cylindrical portion
23h Insertion hole
24 Seal portion
24c Recess portion
24p Protruding portion
25 First protruding portion
26 Second protruding portion
φx Inner diameter of top portion of first protruding portion
φy Inner diameter of top portion of second protruding portion
φc Outer diameter of control cable

The invention claimed is:
1. A seal structure comprising:
a long member; and
an elastic member including an insertion portion through which the long member is inserted and which comes into close contact with an outer periphery of the long member;
wherein the insertion portion comprises:
a cylindrical portion including openings at both ends of the cylindrical portion,
an insertion hole which communicates with the openings and through which the long member is inserted, and
a seal portion configured to seal the long member at an inner wall of the insertion hole;
wherein the seal portion comprises:
a plurality of first protruding portions formed in an elastically deformable manner to relatively strongly press the outer periphery of the long member inserted through the insertion hole and circumferentially come into close contact with the long member, and
a second protruding portion formed in an elastically deformable manner to relatively lightly press the outer periphery of the long member inserted through the insertion hole and come into contact with the outer periphery of the long member;
wherein the first protruding portions are disposed with an interval that allows the long member to be inserted through the insertion hole, and
wherein the second protruding portion is disposed between the first protruding portions.
2. The seal structure according to claim 1, wherein:
the second protruding portion is formed so that the second protruding portion is annular in a circumferential direction of the insertion hole and that an inner diameter of a top portion of the second protruding portion is substantially identical to an outer diameter of the long member, and
the first protruding portions are formed so that the first protruding portions are annular in the circumferential direction of the insertion hole and that an inner diameter of a top portion of each first protruding portions is smaller than the outer diameter of the long member and smaller than the inner diameter of the second protruding portion.
3. The seal structure according to claim 1, wherein an inner diameter of a top portion of the second protruding portion is between 100 percent and 92 percent of an outer diameter of the long member.
4. A seal structure comprising:
a long member configured to be capable of curving; and
an elastic member including an insertion portion through which the long member is inserted and which comes into close contact with an outer periphery of the long member;
wherein the insertion portion comprises:
a cylindrical portion including openings at both ends of the cylindrical portion,
an insertion hole which communicates with the openings and through which the long member is inserted, and
a seal portion configured to seal the long member at an inner wall of the insertion hole;
wherein the seal portion comprises:
a first protruding portion formed in an elastically deformable manner to relatively strongly press the outer periphery of the long member inserted through the insertion hole and circumferentially come into close contact with the long member, and
a second protruding portion formed in an elastically deformable manner to relatively lightly press the outer periphery of the long member inserted through the insertion hole and come into contact with the outer periphery of the long member;
wherein the second protruding portion is formed so that an inner diameter of a top portion of the second protruding portion is substantially identical to an outer diameter of the long member, and
wherein the first protruding portion is formed so that an inner diameter of a top portion of the first protruding portion is smaller than the outer diameter of the long member and the inner diameter of the second protruding portion, and is disposed with an interval from the second protruding portion such that the first protruding portion does not contact with the second protruding portion even when the first protruding portion is deformed by the insertion of the long member.

* * * * *